United States Patent [19]
Jao et al.

[11] Patent Number: 5,894,086
[45] Date of Patent: Apr. 13, 1999

[54] METHOD AND APPARATUS FOR DETECTING CORDS IN COMPOSITES

[75] Inventors: Shyh-Hua Jao; Perry Marteny; George Samuel Fielding-Russell, all of Stow, Ohio

[73] Assignee: The Goodyear Tire & Rubber Company, Akron, Ohio

[21] Appl. No.: 08/813,015

[22] Filed: Mar. 6, 1997

[51] Int. Cl.$^6$ .............................. G01H 1/00; G01N 29/12
[52] U.S. Cl. ............................................... 73/146; 73/579
[58] Field of Search ........................... 73/146, 579, 587; 378/61; 364/508, 550; 152/527, 531, 536, 543, 556, 579

[56] References Cited

U.S. PATENT DOCUMENTS

| | | | |
|---|---|---|---|
| 3,815,407 | 6/1974 | Lavery | 73/146 |
| 3,871,210 | 3/1975 | Himmler et al. | 73/146 |
| 3,967,498 | 7/1976 | Pezzillo | 73/146 |
| 4,491,013 | 1/1985 | Bubik | 73/146 |
| 5,060,250 | 10/1991 | Kwee et al. | 378/61 |
| 5,313,827 | 5/1994 | Yovichin | 73/146 |

Primary Examiner—Hezron Williams
Assistant Examiner—Rose M. Miller
Attorney, Agent, or Firm—David E Wheeler

[57] ABSTRACT

A method and apparatus for detecting anomalous cords in reinforced composites uses means to deform and/or vibrate the composite and detect the vibration signature of the composite. Broken or frayed reinforcement cords in a reinforced composite cause changes in the vibration signature of the composite, and the apparatus used in the method of the invention employs a low damping material which is used in proximal contact to all the reinforcement cords in the reinforced composite, and one or more sensors to detect said changes. The apparatus may also include a computer for collating data, analyzing data, and providing a signal when an anomalous cord is recognized.

26 Claims, 3 Drawing Sheets

METHOD AND APPARATUS FOR DETECTING CORDS IN COMPOSITES

BACKGROUND

The invention relates to a method and apparatus for detecting frayed or broken reinforcement cords in a reinforced composite such as a tire.

Using a pneumatic tire for the purposes of illustration, when a tire goes flat, is run long periods of time underinflated, or hits road objects, the reinforcement cords in the carcass ply are sometimes frayed or broken without any visible change in the tire.

Unseen cord breaks are particularly a problem when retreading tires, because the expense and time needed to retread a defective carcass is wasted.

Although some experienced individuals have acquired the ability to recognize such sidewall defects with good precision on observation, such individuals are scarce, and it is important that a correct diagnosis be made each time a tire carcass is inspected prior to retreading.

X-ray inspection has been used in retreading operations, but x-ray equipment is expensive, requires extra safety precautions to use, and some breaks, where the broken ends are not displaced, may not be observable on the x-ray screen.

It is an object of the present invention to provide a reliable, inexpensive method of detecting frayed or broken cords in a reinforced composite, and to provide an apparatus to be used in the method. Other objects of the invention will be apparent from the following description and claims.

SUMMARY OF THE INVENTION

The invention relates to a method for detecting cords in a reinforced composite comprising the steps of (a) contacting a reinforced composite with a low damping material wherein the low damping material is in proximity to each reinforcing cord in the reinforced composite, (b) placing at least one sensor on the low damping material, (c) subjecting the composite to means which cause the composite to deform and/or vibrate, and (d) using the at least one sensor to detect anomalous cords. The method may further comprise the steps of selecting the low damping material to be a malleable metal or a ceramic material, and forming the material in one piece into a wave guide with a shape adapted for use with a specific composite product.

In an illustrated embodiment the method includes the step of shaping the low damping material in the form of a ring adapted for contacting the sidewall of a tire.

The method may include triangulating sensor readings by deploying three sensors on the low damping material and correlating data from the three sensors to determine the location of an anomaly in the composite.

An apparatus for implementing the method is also provided. The apparatus comprises (a) a low damping material shaped in a manner adapted for placement in close proximity to all reinforcing cords in a reinforced composite, (b) at least one sensor for placement in contact with the low damping material, (c) means for generating vibrations in the composite, and (d) means for collating data on vibration signals in said composite collected by the at least one sensor.

In the illustrated embodiment, the low damping material is a rim on which a tire is mounted or a ring adapted for contact with the sidewall of a tire, and the low damping material is selected from the group consisting of a malleable metal and a ceramic. Also, three sensors are disposed at various locations on said low damping material.

Computer hardware and software may be used to produce an image of the composite on a monitor whereby data from the sensors are processed to indicate the location of anomalies in the composite on the monitor.

In a preferred embodiment, the computer and software may be adapted to collect data, compare data, and provide a yes/no indication of the suitability of the tire for retreading.

DETAILED DESCRIPTION OF THE INVENTION

Figure 1:
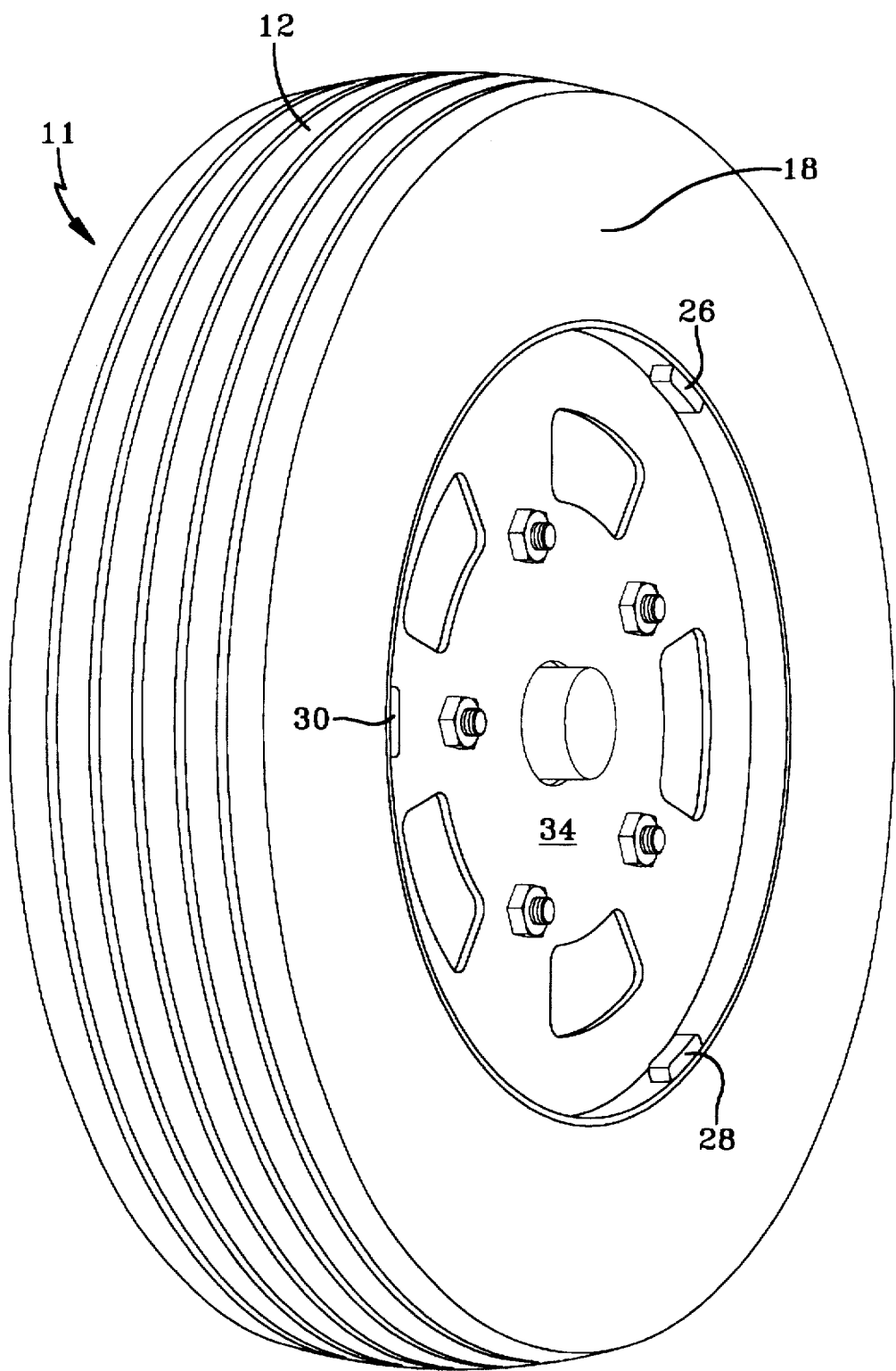
FIG. 1 illustrates a tire, which is a reinforced composite, mounted on a rim.

With reference to FIG. 1, a composite is illustrated in the form of a tire. Tire and rim assembly 11 is illustrated wherein tire 10 is mounted on rim 34. At least one sensor 28 is located on rim 34.

Figure 2:
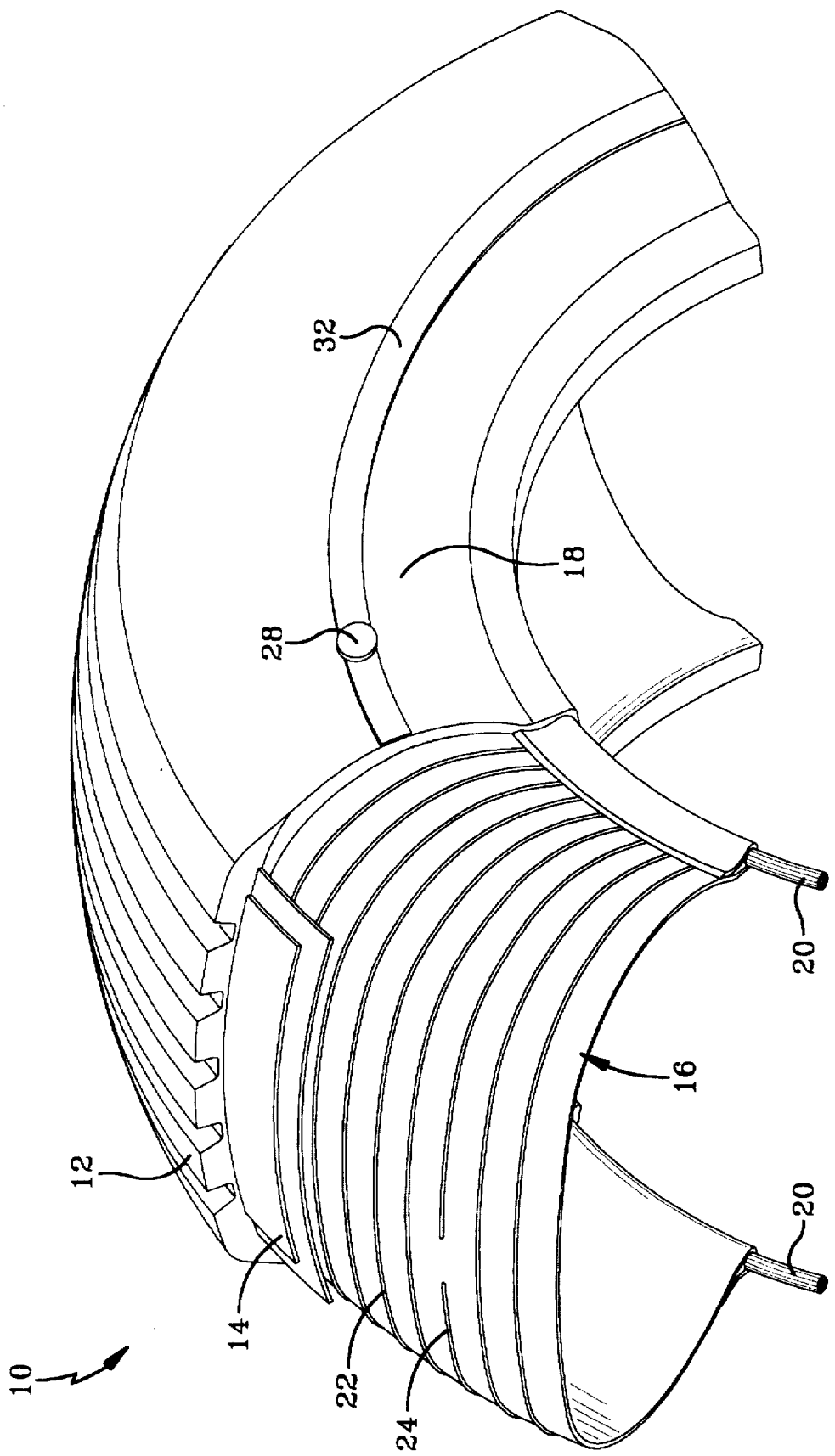
FIG. 2 illustrates a perspective view of a tire contacting a ring of low damping material and sensors.

With reference to FIG. 2, tire 10 comprises a pair of parallel annular beads 20, reinforced carcass plies 16 wrapped around beads 20, belts 14 disposed over carcass plies 16 in a crown area of tire 10, tread 12 disposed radially outward of belts 14, and sidewalls 18 disposed between tread 12 and beads 20. Reinforcement cords 22 of the carcass ply 16 are generally parallel to one another, and are radially disposed. Cord 24 is illustrated as being separated.

In an embodiment of the invention where an outside source sets up deformations and/or vibrations in a composite, continuous cords 22 are capable of transferring vibrations through the rubber of sidewall 18 perpendicular to the cord 22 in tire 10, whereas a separated cord 24 is not capable of transferring a vibration through the sidewall rubber perpendicular to the cord.

In an alternative embodiment of the invention where vibrations are generated in a broken or frayed cord when stresses are placed on a composite, it is separated or frayed cord 24 that causes a vibration that can be detected.

Those skilled in the art will recognize from the following description that the invention may be used with bias ply tires, or with entirely different kinds of composites.

It has been found that the bead 20 of the tire, because it is in contact with all the carcass cords of the tire, and because it is usually made of an inextensible low damping material, provides and excellent place to monitor vibrations of carcass cords in the tire.

With reference again to FIG. 1, at least one sensor 28 may be placed in close proximity to bead 20, preferably on rim 34, and in the illustrated embodiment, three sensors 26, 28, and 30 are so placed. In order to enhance the transfer of vibrations from the bead to the rim, it is preferred to fully grease the rim flange to provide a uniform medium for contact between the rim and the tire. The grease may comprise, for example, Murphy's soap. Other suitable greases will be apparent to those skilled in the art.

In one embodiment, the tire 10 may be placed on rim 34 as described above, and the tire can be slowly inflated to initiate the acoustic signals indicating the condition of the tire. While the tire is being inflated the cords stretch, and cords that have separations or are frayed exhibit chafing between the separated or frayed ends which can be detected as ultrasound by sensors. Such chafing can also be detected if the tire is vibrated or deformed slowly, such as by pressing or pushing on a portion of the tire.

Alternatively, an inflated tire can be shaken or vibrated rapidly to set up a vibration in all the cords of the tire, wherein cords that are separated or frayed will not transfer its vibration to the at least one sensor, and such cords cause an interruption in the vibration pattern of the tire which can be analyzed.

Accordingly, the signal detected by the sensors may be a nullity in an otherwise homogeneous acoustic pattern, or the direct measurement of the sounds of broken or frayed cords.

Figure 3:
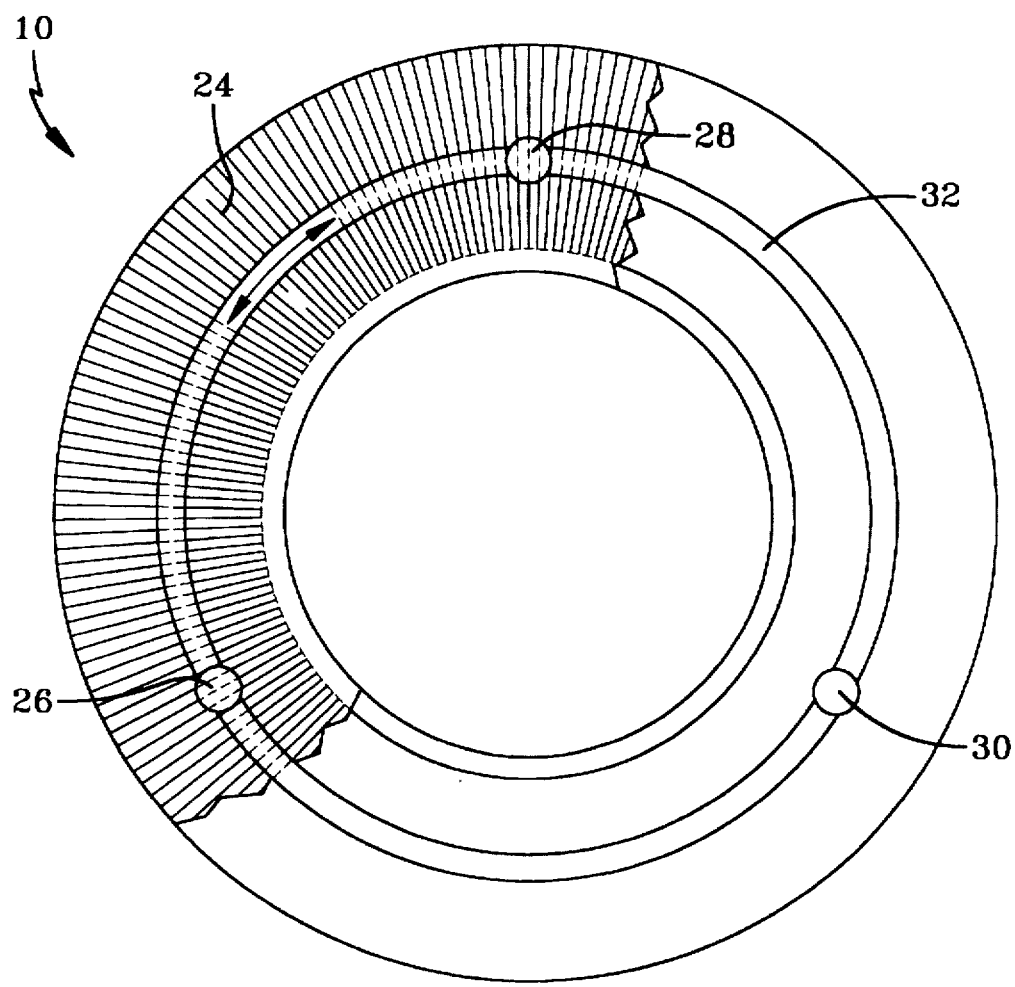
FIG. 3 illustrates a side view of a ring of low damping material in contact with the sidewall of a tire.

The low damping material is preferably selected to be a malleable metal or a ceramic material, and it is preferred that the low damping material be formed in one piece in a shape adapted for use with a specific composite product. In the illustrated embodiment the low damping material is shaped in the form of a ring adapted for contacting the sidewall of a tire. With reference to FIGS. 2 and 3, in an illustration of an alternative method of the invention, the ring 32 made of low damping material is placed on sidewall 18 of tire 10 in a location chosen so that indicia on the tire does not lessen the area of contact between the ring and the tire sidewall. The low damping material is selected to be steel.

Acoustic emissions are generated at the frayed ends when the tire is deformed, or put through low frequency vibrations.

Means of generating vibrations in the composite may also be a source of acoustic emissions such as an ultra sound generator. Those skilled in the art will recognize other possible means for setting up vibrations in a composite.

The means provided to cause a vibration in the tire may be a simple mechanical or electrical stimulation of the tire, for example deforming the sidewall of the tire manually when the tire is inflated, or as another example, an ultra sonic generator whether the tire is inflated or not inflated. In accordance with the invention, any means known to those skilled in the art can be used to set up a detectable acoustic vibration or detectable acoustic vibration pattern in tire 10. The vibrations of separated or frayed cords may be recorded by at least one sensor 28 directly, or a pattern that is only interrupted when a cord is missing, separated, or weakened to the extent that it cannot transfer a vibration can be detected.

With reference to FIGS. 1, 2 and 3, in the illustrated embodiment, three sensors 26,28,30 are placed at various points around the tire's bead or sidewall in order to triangulate interruptions or anomalies in the vibration pattern observed by the sensors, and thereby locate the source of the anomaly. By overlapping the vibration patterns detected by the three sensors, the distance of an anomaly from each sensor can be determined.

Figure 4:
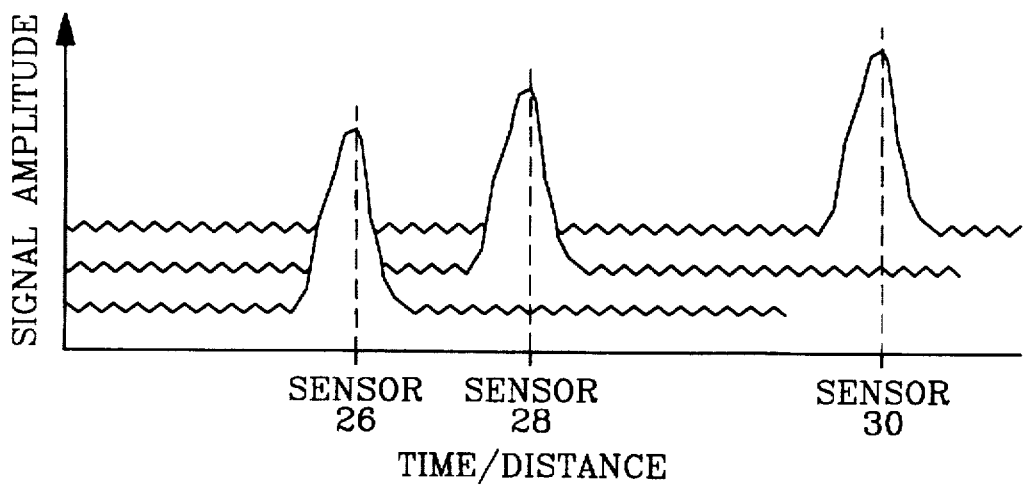
FIG. 4 illustrates a graph of one possible noise signature for the tire of FIG. 2.

With reference now to FIG. 4, in one possible method of correlating data from the three sensors to determine the location of an anomaly in the composite, peaks from sensor 26, sensor 28, and sensor 30 are shown simultaneously on the same display in different locations representing the time axis. Separations between the peaks on the display represent different time differentials between signals in the vibration pattern and illustrate when the signals are detected by each sensor. Using these time differentials, the position of the cord or other structure causing the signal in the acoustic vibration pattern, in relation to the sensors, can be determined using techniques known to those skilled in the art.

The apparatus for implementing the method, as illustrated in reference to the method, may be used in conjunction with means for collating data obtained by the at least one sensor, and may be equipped with means for displaying the results as well as means for sounding an alarm when anomalies are detected.

For example, computer hardware and software may be used to produce an image of the composite on a monitor whereby data from the sensors are processed to indicate the location of anomalies in the composite on the monitor.

In a preferred embodiment, the computer and software may be adapted to collect data, compare data, and provide a yes/no indication of the suitability of the tire for retreading.

While the invention has been specifically illustrated and described, those skilled in the art will recognize that the invention can be variously modified and practiced. The scope of the invention is limited only by the following claims and equivalents thereof.

What is claimed is:

1. A method for detecting cords in a reinforced composite comprising the steps of
   (a) contacting a reinforced composite with a low damping material wherein said low damping material is in proximity to each reinforcing cord in said reinforced composite
   (b) placing at least one sensor on said low damping material
   (c) subjecting said composite to means which cause cords in the composite to vibrate
   (d) using said at least one sensor to detect anomalous cords, and
   (e) inflating said reinforced composite to generate acoustic vibrations.

2. The method of claim 1 which comprises the further step of selecting said low damping material to be a malleable metal or a ceramic material.

3. The method of claim 2 which further comprises forming said material in one piece in a shape adapted for use with a specific composite product.

4. The method of claim 3 which comprises the further step of shaping said low damping material in the form of a ring adapted for contacting the sidewall of a tire.

5. The method of claim 1 wherein said at least one sensor comprises three sensors and comprises the further step of triangulating sensor readings by deploying said three sensors on said low damping material.

6. The method of claim 5 comprising the further step of correlating data from said three sensors to determine the location of an anomaly in the composite.

7. The method of claim 1 comprising the further step of selecting said low damping material to be steel.

8. A method for detecting cords in a reinforced composite comprising the steps of
   (a) contacting a reinforced composite with a low damping material wherein said low damping material is in proximity to each reinforcing cord in said reinforced composite
   (b) placing at least one sensor on said low damping material
   (c) subjecting said composite to means which cause cords in the composite to vibrate
   (d) using said at least one sensor to detect anomalous cords, and
   (e) causing said vibrations using cyclic mechanical vibration causing means.

9. The method of claim 8 which comprises the further step of selecting said low damping material to be a malleable metal or a ceramic material.

10. The method of claim 9 which further comprises forming said material in one piece in a shape adapted for use with a specific composite product.

11. The method of claim 10 which comprises the further step of shaping said low damping material in the form of a ring adapted for contacting the sidewall of a tire.

12. The method of claim 8 wherein said at least one sensor comprises three sensors and comprises the further step of triangulating sensor readings by deploying said three sensors on said low damping material.

13. The method of claim 12 comprising the further step of correlating data from said three sensors to determine the location of an anomaly in the composite.

14. The method of claim 8 comprising the further step of selecting said low damping material to be steel.

15. An apparatus for detecting cords in a reinforced composite comprising (a) a low damping material shaped in a manner adapted for placement in close proximity to all reinforcing cords in a reinforced composite (b) at least one sensor for placement in contact with said low damping material, and (c) means for collating data on acoustic vibrations in said composite collected by said at least one sensor, wherein said low damping material is rim on which a tire is mounted.

16. The apparatus of claim 15 wherein said low damping material is selected from the group consisting of a malleable metal and a ceramic.

17. The apparatus of claim 15 further comprising means for determining the location of anomalies in reinforcement cords in said composite.

18. The apparatus of claim 17 wherein said at least one sensor comprises three sensors which are disposed at various locations on said low damping material.

19. The apparatus of claim 18 wherein computer hardware and software are used to produce an image of said composite on a monitor whereby data from said sensors are processed to indicate the location of anomalies in said composite on said monitor.

20. The apparatus of claim 15 wherein means of generating acoustic vibrations at broken cords is a cyclic mechanical tester or low frequency shaker.

21. An apparatus for detecting cords in a reinforced composite comprising a low damping material shaped in a manner adapted for placement in close proximity to all reinforcing cords in a reinforced composite (b) at least one sensor for placement in contact with said low damping material, and (c) means for collating data on acoustic vibrations in said composite collected by said at least one sensor, wherein said low damping material is shaped into a ring adapted for contact with a sidewall of a tire.

22. The apparatus of claim 21 wherein said low damping material is selected from the group consisting of a malleable metal and a ceramic.

23. The apparatus of claim 21 further comprising means for determining the location of anomalies in reinforcement cords in said composite.

24. The apparatus of claim 23 wherein said at least one sensor comprises three sensors which are disposed at various locations on said low damping material.

25. The apparatus of claim 24 wherein computer hardware and software are used to produce an image of said composite on a monitor whereby data from said sensors are processed to indicate the location of anomalies in said composite on said monitor.

26. The apparatus of claim 21 wherein means of generating acoustic vibrations at broken cords is a cyclic mechanical tester or low frequency shaker.

\* \* \* \* \*